United States Patent [19]

Korff et al.

[11] 4,323,337
[45] Apr. 6, 1982

[54] SELECTIVE MULTIPLE PIPE COMPRESSION BELLING MACHINE

[76] Inventors: Wolfram G. Korff, 12153 Gerald Ave.; Vernon V. Emery, 16852 Knollwood Dr., both of Granada Hills, Calif. 91344; Joseph K. Bond, 8007 Shadyglade Ave., North Hollywood, Calif. 91605

[21] Appl. No.: 957,351

[22] Filed: Nov. 3, 1978

Related U.S. Application Data

[62] Division of Ser. No. 808,070, Jun. 20, 1977, abandoned.

[51] Int. Cl.³ ............................................. B29D 23/00
[52] U.S. Cl. .................................... 425/155; 264/297; 425/162; 425/393
[58] Field of Search ..................... 425/393, 155, 162; 264/297

[56] References Cited

U.S. PATENT DOCUMENTS

| 3,923,443 | 12/1975 | Emery | 425/393 X |
| 3,932,094 | 1/1976 | Korff | 425/393 |
| 4,004,701 | 1/1977 | Moses | 214/16.4 A |
| 4,104,013 | 8/1978 | Kelly | 425/393 X |
| 4,108,589 | 8/1978 | Bunch | 425/393 |

Primary Examiner—Thomas P. Pavelko
Attorney, Agent, or Firm—Smyth, Pavitt, Siegemund & Martella

[57] ABSTRACT

A compression belling machine for precision belling simultaneously of a plurality of plastic pipe ends. This is accomplished by selectively feeding groups of pipes, the ends of which are to be belled, first into a heating unit and then, transferring them by an endless conveyor, simultaneously into a belling station having a plurality of molds one-half of each of which molds is stationary and the other half of which may be moved apart from its mating half to permit insertion between the separated halves of a heated end of one pipe. Each of the molds is entirely separate from the other molds and each mold may be removed from the apparatus for replacement. All mold halves, however, are moved together by a common hydraulic head. Control means are provided to operate a novel sequential type feeder and so that pipes may be selectively deposited into the heater and then aligned with their ends properly inserted into the particular mold cavities.

2 Claims, 10 Drawing Figures

SELECTIVE MULTIPLE PIPE COMPRESSION BELLING MACHINE

This is a division of application Ser. No. 808,070, filed June 20, 1977, now abandoned.

BACKGROUND OF THE INVENTION

1. Field of the Invention

This invention relates generally to machines for automatically belling the ends of plastic pipe, and particularly to such machines as are designed to bell a plurality of pipe ends simultaneously under compression.

2. Description of the Prior Art

Numerous machines have been heretofore devised for belling plastic pipe. As such machines were originally developed, provision was made first for heating the end of the plastic pipe and then moving it into axial alignment with a mandrel, at which point the pipe and/or mandrel would be moved relative to each other to insert the mandrel into the pipe end to expand the same. Thereupon, the mandrel would be left in the pipe end until the pipe end cooled. The mandrel and/or pipe end would then be oppositely moved relative to each other to effect a withdrawal of the mandrel from the pipe end, and the pipe end would then be discharged from the machine. An illustration of this method of belling pipe is found in U.S. Pat. No. 3,910,744 issued Oct. 7, 1975. Some other patents similarly illustrating this simple technique are the following:

| U.S. Pat. No. | Issued |
| --- | --- |
| 3,923,443 | December 2, 1975 |
| 3,205,535 | September 14, 1965 |
| 3,360,826 | January 2, 1968 |

Due to the fact that cooling of plastic pipe on the mold has required a certain minimum time, i.e., generally not less than half a minute, and this slowed the production rate of belled pipe, efforts were undertaken by belling machine builders to circumvent this minimum time requirement for cooling of plastic pipe ends. One approach was, in effect, simply to provide a plurality of pipe belling lines operating side by side, thereby to double or triple the number of pipe ends which the machine could bell in the same length of time. This technique is illustrated in U.S. Pat. No. 3,672,804, granted June 27, 1972 to Dalik.

The present inventors, however, developed another approach to increasing the rate at which a belling machine could bell pipe as illustrated in their prior U.S. Pat. No. 3,932,094, issued Jan. 13, 1976. As may be seen from this last mentioned patent, the mandrel is moved with the pipe during its cooling period, to make room for a succeeding mandrel which may be inserted in the next pipe to be belled.

By whatever technique belling has thus been accomplished, due to a number of factors, such as pipe shrinkage after removal from the mandrel, the internal configuration of the belled pipe end had not proved to be sufficiently precise to meet the standards of the Underwriters Laboratories. Consequently, the present inventors more recently invented a compression type belling machine which is disclosed and claimed in their copending application Ser. No. 717,874, filed Aug. 26, 1976, now U.S. Pat. No. 4,059,379 issued Nov. 22, 1977, to which reference is hereby made. In effect, this last mentioned belling machine places the softened pipe end in a mold cavity precisely defining the desired external configuration for the pipe end after belling, and provision is made for the insertion of the mandrel into the pipe end while it is held in this mold cavity. After insertion of the mandrel, a sleeve-like compressor moves along and toward the end of the mandrel until it contacts and then compresses axially the exposed pipe end in the mold. This axial compression of the pipe end causes it to conform to both the precise external configuration and dimensions of the encircling mold and also to the precise internal configuration and dimensions of the mandrel itself. Upon cooling, the thus-compressed and formed pipe end retains its precise configuration and dimensions.

Thus, while the pipe belling machine art has evolved to provide both for rapid belling of pipe ends and also the compression belling of the same, no machine has heretofore been developed to accomplish both rapid belling and compression of pipe ends, despite the need for such a machine which can produce at a rapid rate belled pipe ends which will conform to the standards of the Underwriters Laboratories.

SUMMARY OF THE INVENTION

The present invention utilizes, with certain improvements, the compression belling technology taught in our said prior application Ser. No. 717,874 filed Aug. 26, 1976, now U.S. Pat. No. 4,059,379 issued Nov. 22, 1977, in a machine which, however, is designed to bell pipe at a considerably faster rate than has been possible with the single mold machine of applicants' said prior patent application. This is accomplished by providing a plurality of replaceable mold blocks which may be placed adjacent to each other or spaced apart in a multiple molding station. One-half of each of the mold blocks may be fixedly mounted in that station, and the other half of each mold may be mounted on a common movable compression block. A plurality of pipes is first deposited one at a time, but in quick sequence, in a heating station where they are retained long enough to soften the pipe ends. Thereupon the group of pipes, the ends of which have been in the heating station, is moved transversely simultaneously, to deposit their softened pipe ends, one in each of the lower halves of the separated molds. After the group of pipes is thus deposited in the mold halves, the common movable compression block is moved to close simultaneously all of the mold halves about the heat-softened pipe ends. A mandrel is then inserted simultaneously into each of the thus-held pipes ends followed by a coaxial compression sleeve similar to what has been disclosed in said prior co-pending patent application Ser. No. 717,874. After the pipe ends have thus been compression-formed to the desired precise configuration and dimensions, the mandrels are retracted, the sleeves are withdrawn, the mold halves are separated, and the group of thus-belled pipes is moved on for discharge from the machine.

The multiple molding station may, in an alternative embodiment, include mold blocks and mandrels for simultaneously belling pipes of various diameters; but, in the preferred embodiment all the mold blocks and mandrels are the same size.

To provide for the proper timing and disposition of the pipes, the ends of which are to be thus belled, a conveyor system generally similar to what is disclosed in said prior U.S. Pat. No. 3,932,094, may be utilized. However, because the pipe ends are to be belled in groups, rather than in series as in said prior patent, there is provided a novel rotary escapement feeder mechanism in the feeder line which permits the feeding into alignment with the heater of the proper number of pipes. After heating, the pipes are moved as a group, each spaced from the adjacent pipes, into the molding or pipe forming station.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
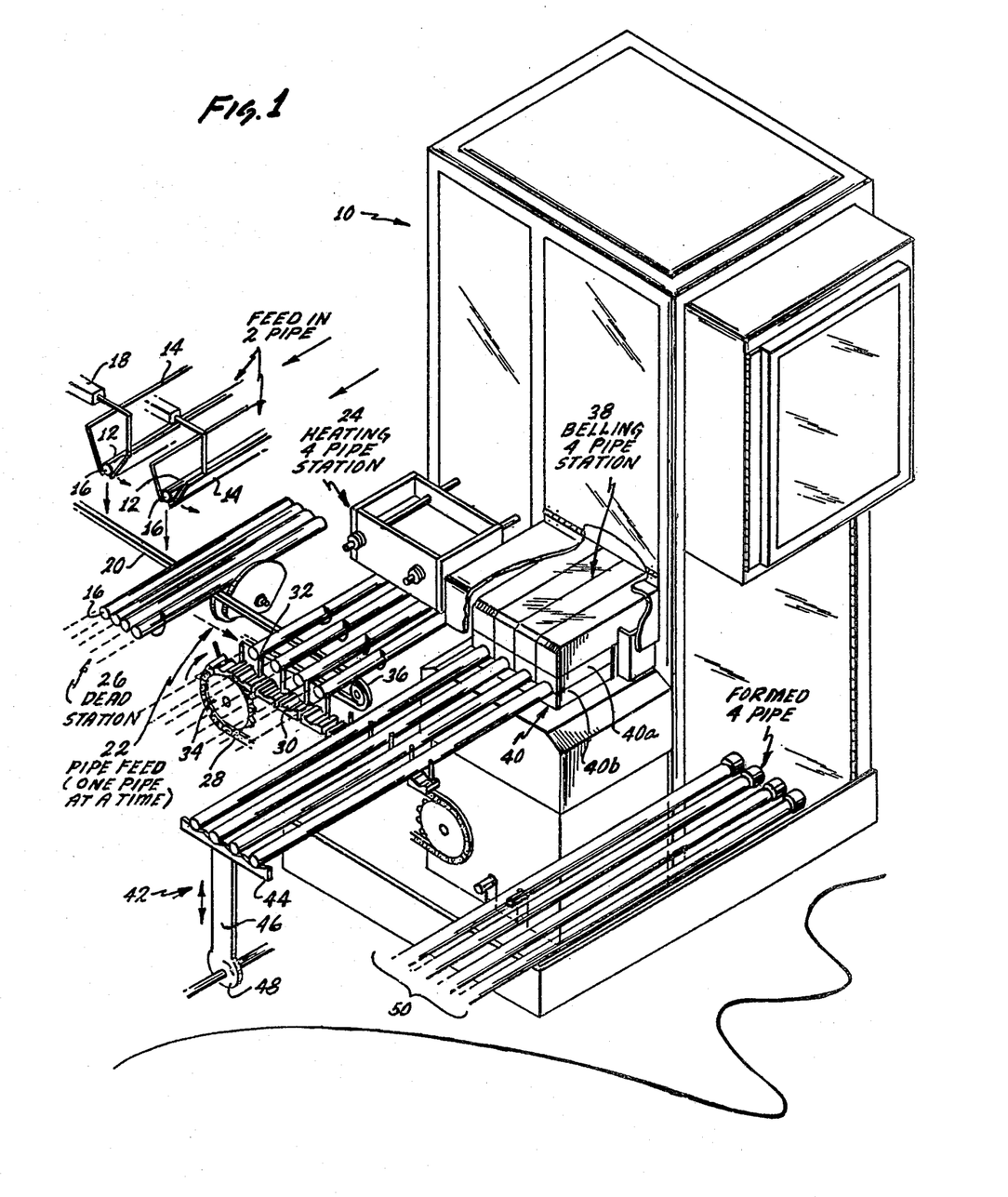
FIG. 1 is a perspective view of a preferred embodiment of the pipe belling machine of the present invention.

Turning now to the Figures, in which like parts are denoted by the same reference numeral, there is shown in FIG. 1 a perspective view of the pipe belling machine 10 of the present invention. The pipe belling machine 10 is intended for use with a pipe extruding machine (not shown). The pipe extruding machine typically is capable of extruding a specified volume of plastic pipe per unit of time. If large diameter pipe is being formed, a single strand of pipe will be extruded continuously. If small diameter pipe is being formed, the capacity of a typical extruding machine is sufficient to permit the simultaneous extrusion of two pipes. Typically, in such a twin-strand line, the two pipes are extruded horizontally and parallel to each other in a continuous motion. The extruded pipes are cut into standard lengths (typically twenty feet) by a saw which moves at the same speed as the pipe, cutting the pipe while it is in motion.

For purposes of this application, the saw will be regarded as part of the extruding machine. Normally, if two strands of pipe are being produced, they are of the same diameter. The pipe belling machine 10 is designed throughout for operation with pipes having diameters ranging from half-inch to two inches nominal, or from 0.840" to 2.35" respectively actual O.D.

The extrusion rate depends on the diameter of pipe that is being formed. Pipe of small diameter is normally formed at a greater linear rate than pipe of larger diameter. Further, when a twin-strand line is being produced, it is not unusual for the strands to move at slightly different speeds. The pipe belling machine 10 of FIG. 1 is designed to be compatible with such a mode of operation.

The advancing strands of pipe 12 from the extruder are carried in troughs 14. By the time the pipe has reached the position shown in FIG. 1, it has been cut into standard length sections. The pipe continues to advance in the troughs 14 until the leading end 16 of the pipe reaches a stop (not shown, but located to the left of the machine shown in FIG. 1). The force of the impact of the leading edge 16 of one of the pipes against the stop operates an actuator 18 which opens the bottom of the trough 14, permitting the section of pipe to drop out onto the conveyor belt 20.

The conveyor belt 20 is canted slightly from a perpendicular to the axis of the pipes. This causes the pipe sections to be thrust axially against an abutment, also referred to as the rear fence, which causes their leading ends 16 to become aligned. The conveyor belt 20 also drives the pipes forward toward the pipe feed 22, where the pipes accumulate side by side awaiting transfer to the heating station 24. Thus, the conveyor belt 20 cooperates with the pipe feed 22 and the troughs 14 to form a dead station 26 for the pipe sections. The dead station 26 is of considerable importance because it permits the pipe belling machine 10 to perform its operations at times and speeds which are determined by the pipe belling machine 10 rather than at times and speeds determined by the extrusion machine. In particular, it permits the pipe belling machine to operate effectively with a dual-strand extrusion line with the strands advancing at different speeds or varying speeds.

The length of time required to bell a piece of plastic pipe cannot be reduced below a determinable value regardless of how rapidly the pipe is passed from one station to the next. A certain amount of time is required for the heat, applied at the heating station 24, to penetrate throughout the pipe. Further, an additional amount of time is required for the belled pipes to cool sufficiently so that the belling mandrel can be withdrawn from the end of the pipe without disturbing its dimensional stability. As a practical matter, it is difficult to reduce the time required to bell a pipe.

On the other hand, as extruding machines of greater capacity become available, it becomes highly desirable to increase the number of pipes that can be belled each minute. To achieve this desirable result, the belling machine of the present invention processes a number of pipe sections through the belling process in parallel. Although a preferred embodiment of the invention is adapted to process four pipe sections simultaneously, it is clear that in general, the invention contemplates the simultaneous processing of any reasonable number of pipe sections. Indeed, the preferred embodiment can process pipe sections in groups of four, three, two, or one, as may be desired.

The heating station 24 includes a number of radiant electrical heating elements arrayed above the pipes being heated, and further includes a reflector located below the pipes to enhance the heating of them. It is desirable that the pipes being heated should be maintained in a spaced-apart relationship so that they do not rub against each other and to prevent the pipes from shadowing each other. It is also desirable that the pipes being heated should rotate about their longitudinal axis to promote uniformity of heating.

These goals are accomplished by the use of an endless chain 28 to which a number of grooved cleats 30 are attached. A finger 32 is attached to each of the cleats 30. The drive wheel 34 is positioned slightly forward of the pipe feed 22 so that as each pipe is released by the pipe feed 22, it is driven forward by the belt 20, but restrained behind one of the pins 32. The restraint of the pin 32 combined with the motion of the belt 20 causes the pipes to rotate while they are in the heating station 24 while at the same time the pipes are held in a spaced relationship by the pins 32. The upper surface of the belt 20, on which the pipes rest while they are in the heating station 24, is at a higher elevation than the grooved cleats 30. Consequently, when the chain 28 is advanced, the pipes roll over the end 36 of the belt 20 and fall into the grooved cleats. A plurality of chains with grooved cleats similar to the chain 28 are provided at points along the lengths of the pipes to maintain the parallel relation of the pipes and to facilitate moving them. The other chain (not shown) is located to the left of the one shown in FIG. 1. The chain 28 does not move continuously, but instead it moves intermittently under the control of the pipe belling machine 10. The V-shaped grooves in the cleats 30 assure kinematic centering of the pipes regardless of the size of the pipes and maintain a predetermined spacing between the axes of the pipes.

After passing the end 36 of the belt 20, the pipes are moved as a group to a position adjacent the pipe belling station 38. In the preferred embodiment, four molds 40 are located at the belling station 38. Each mold includes a fixed upper portion 40a and a movable lower portion 40b. The lower section of the mold is lowered to open the mold for insertion of the pipes. Thereafter, the halves of the mold are forced together under great pressure so that the pipe is firmly held in place in the mold during the belling operation. Resilient elements (not shown in FIG. 1) inside the mold halves contact the pipe to enhance the grip of the mold on the pipe to prevent axial slippage.

In the preferred embodiment, the elevation of the centers of the molds is different from that of the grooved cleats 30 on the chain 28. Therefore, it is necessary to stop the chain drive 28 when the pipes to be belled have progressed to positions in front of the molds. At that point, a pair of lifting mechanisms (one shown) 42 lifts the pipes as a group to the elevation of the belling station 38.

The lifting mechanism 42 includes a pipe-carrying portion 44 which has a number of the V-shaped grooves in it, the spacing of the grooves being identical with that of the grooved cleats 30. The pipe-carrying portion 44 is connected to a vertical member 46 which is driven by the cam 48. The operation of the cam 48 is coordinated with the intermittent motion of the chain 28, the pipe feed 22 and the movable mold halves 40b in a manner which will be described below. Upon completion of the belling operation, the mold 40 is opened and the chain 28 is advanced to convey the belled pipes to another dead station 50 to await packaging or further operations.

The pipe feed 22 of FIG. 1, also called the escapement herein, does not have a screw-type configuration. As can be better seen in FIGS. 4-7, the pipe feed 22 comprises two flat parallel plates 52 and 54, which are rigidly connected to a shaft 56 which is perpendicular to the plates. As can be seen in FIGS. 4-7, the plates 52 and 54 each have generally the shape of a sector of a circle. When it is time to feed a pipe from the dead station 26 to the heating station 24, the shaft 56 is programmed to execute one complete revolution. FIGS. 4-7 show the action of the pipe feed 22 at various phases of the revolution. As described above, the pipes 12 are resting on the belt 20, which tends to carry the pipes forward in the direction of motion of the belt 20. The complete cycle of operation can be described starting at any point in the cycle.

Figures 3, 4, 5, 6, 7:
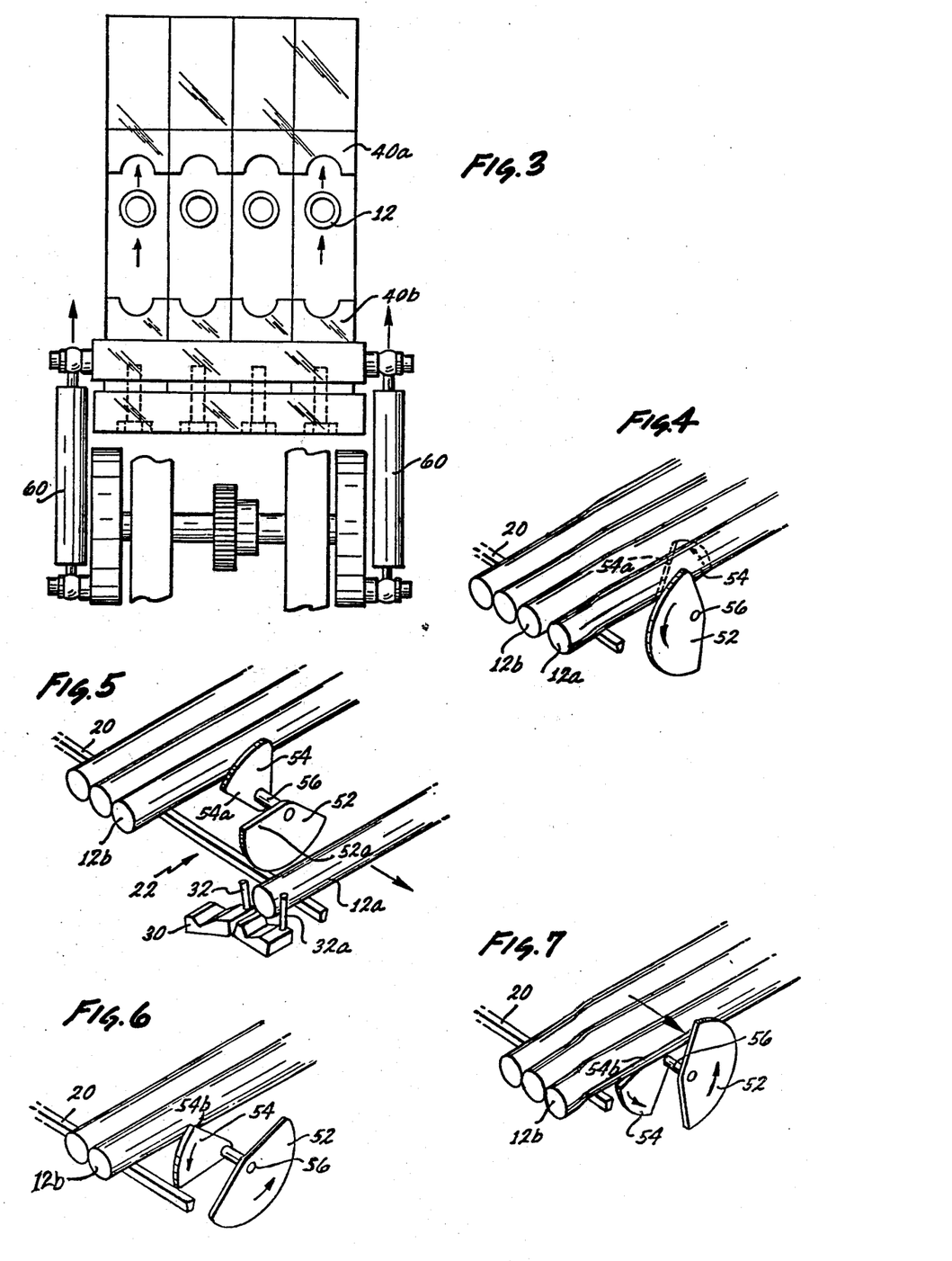
FIG. 3 is a side elevation view of the belling station.
FIG. 4 is a perspective view of the dead station and pipe feeding escapement used in a preferred embodiment of the pipe-belling machine shown in an initial position.
FIG. 5 is a perspective view similar to that of FIG. 4 but showing the apparatus at a slightly later time in its cycle of operation.
FIG. 6 is a perspective view similar to that of FIG. 5 but showing the apparatus at a later time in its cycle of operation.
FIG. 7 is a perspective view similar to that of FIG. 6 but showing the apparatus at a still later time in its cycle of operation.

In the initial or home position shown in FIG. 4, the rotating plate 54 has just separated the pipe 12a from the remaining waiting pipes. The pipe 12a is prevented from advancing under the action of the conveyor belt 20 by the plate 52.

A short time later, the pipe feed 22 has rotated to the position shown in FIG. 5. In that position, the plate 52 has rotated to a position entirely below the lowest portion of the pipe 12a, thereby permitting the pipe 12a to advance forward under the action of the belt 20. The remaining pipes are prevented from moving forward by the plate 54. Shortly after the pipe 12a has been released by the plate 52, one of the fingers 32 connected to the V-shaped cleat 30 arises behind the pipe 12a to capture it between the finger 32 and the preceding finger 32a. The pipe, at this time, is still resting on the belt 20 and therefore is driven forward against the finger 32a. The fingers serve to relate each pipe to a specific V-shaped cleat and to maintain that association so that, upon reaching the end of the belt 20, each pipe will drop into its own V-shaped cleat, which serves to position the pipes, as shown in FIG. 1.

FIG. 6 shows a slightly later stage of the rotation of the shaft 56. The plate 54 restrains the forward motion of the waiting pipe 12b as the leading edge of plate 52 begins to rise above the blocking level.

After an interval of time has elapsed, the pipe feed 22 has rotated to the position shown in FIG. 7. In that position, the trailing edge 54b of the plate 54 has rotated so that the entire plate 54 lies below the lowest portion of the pipe 12b, which is driven forward toward the plate 52. The other pipes also are driven forward by the action of the belt 20, but are now restrained against further movement by the blocking action of the raised portion of the plate 52. Further rotation returns the pipe feeder to the home position shown in FIG. 4.

FIG. 3 is a side view of the 4-pipe belling station. The upper and lower mold halves 40a and 40b are shown in the open position. The cavity formed by the mold halves 40a and 40b when they are moved together conforms to the shape of the desired belled pipe end. If the diameter of the pipe to be held is changed, as it might be from one day to the next, the mold halves must be replaced with ones of appropriate size. The crank rods 60 provide initial positioning of a lower mold half 40b so that various sizes of pipe can be accommodated with the same limited stroke of the bottom mold half.

As pointed out in connection with FIG. 1, the pipes are spaced and elevated by the cam actuated lifting mechanism of FIG. 1 which positions the pipes substantially shown in FIG. 3. The left hand ends of the pipes are maintained in a line by a guide (not shown), and considering that the pipes are substantially equal in length, they extend into the molds substantially the same distance. After the pipes have been inserted into the mold, the mold halves are moved together and the belling operation begins.

Figures 2, 8:
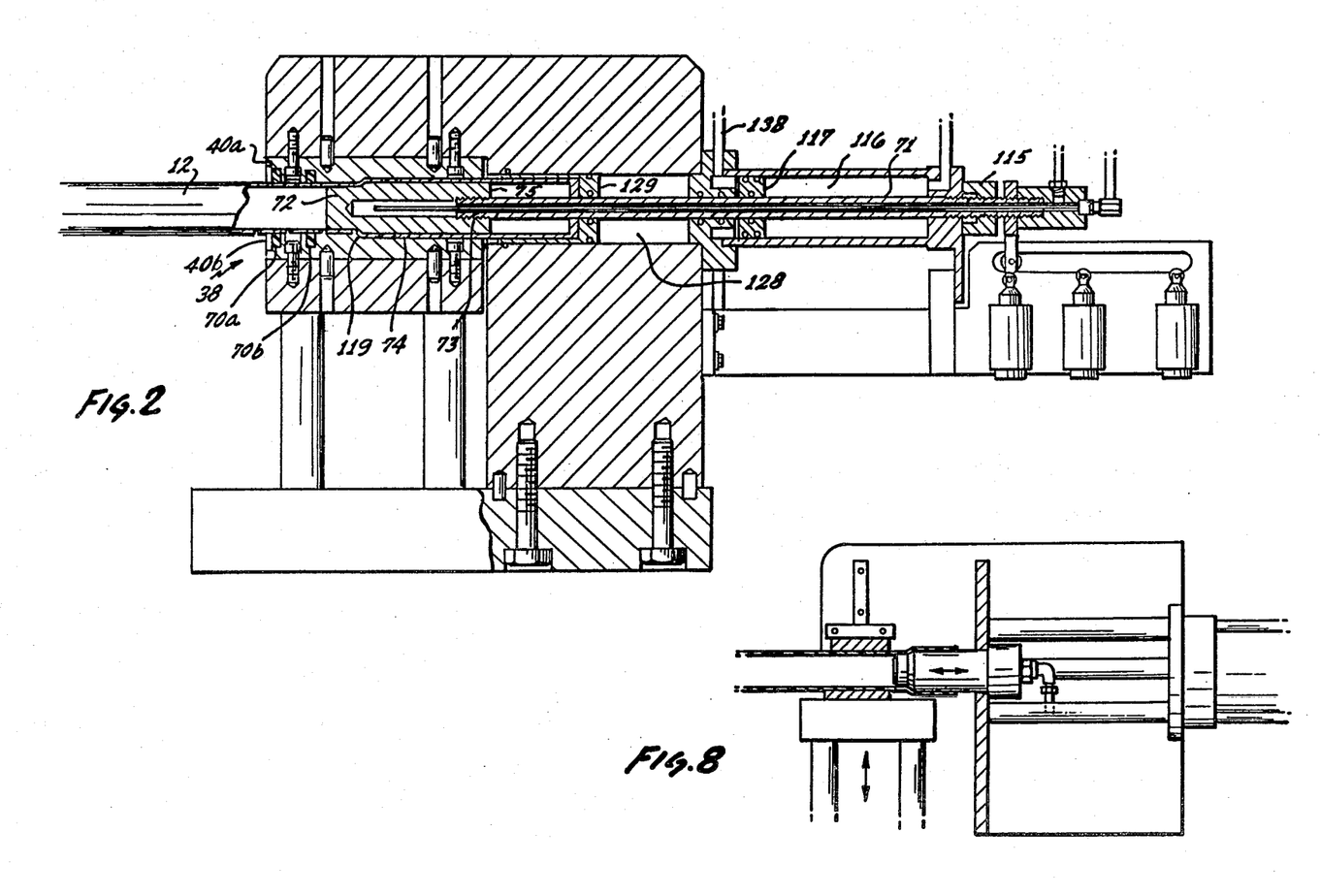
FIG. 2 is a front elevation view in cross section of a belling station.
FIG. 8 is a front elevation view in cross-section of a freeform belling station used in an alternative embodiment of the invention.

FIG. 2 shows a pipe 12 which has been inserted between the mold halves 40a and 40b and which is being belled. The belling process is similar to that described in the co-pending application Ser. No. 717,874, filed Aug. 26, 1976, now U.S. Pat. No. 4,059,379 issued November 1977 for IMPROVED METHOD OF BELLING PLASTIC AND APPARATUS THEREFOR, by Korff et al., and assigned to the assignee of the present invention. After the heated end of the pipe 12 has been inserted, the mold halves 40a and 40b are moved together and the end of the pipe is grasped by the resilient elements 70a and 70b to prevent the pipe from sliding along its axial direction. The pipe 12 has been heated previously at the heating station 24 of FIG. 1 to a temperature of approximately 350° F. Next, a mandrel 72 which has been heated to approximately 240° F. is forced by pneumatic pressure into the heated end of the pipe, causing it to flare radially outwardly to form a belled section 12c. If this is all that was done, the belled section 12 would have a thinner wall thickness than the remainder of the pipe 12, and the outside diameter of the belled section would not necessarily be formed with great dimensional accuracy. If the mandrel were to be withdrawn at this point, the process would be referred to as freeform belling, and the resulting belled pipe would be sufficiently accurate for some applications. FIG. 8 shows a belling station for freeform belling. However, if it is desired that the belled section 12c have substantially the same wall thickness, or even greater wall thickness as the remainder of the pipe 12, a further step is taken, which assures that the outer diameter of the belled section will accurately conform to predetermined dimensions. In that further step, the mandrel 72 is left inserted into the pipe 12 and a sleeve 74 is slid axially into the space between the mandrel 72 and the mold halves 40a and 40b. As the sleeve 74 is inserted under hydraulic pressure, it contacts the end of the belled section 12c and compresses it, causing the heated pipe material to fill up the entire space between the mandrel and the mold. This step assures that the belled section will have outer dimensions conforming to those of the mold, while its inner dimensions are determined by the mandrel 72. When this additional step is used, the process is referred to as compression belling. Next, the mold halves are cooled, the sleeve 74 is withdrawn axially from the mold, and after the pipe in the mold has cooled to a temperature between 100° and 120° F., the mandrel 72 also is withdrawn from the pipe 12. Finally, the mold halves 40a and 40b are separated to permit the belled pipe to be removed. Although compression belling is used in the preferred embodiment, the pipe belling machine is compatible with the freeform belling process.

In FIG. 2, it can be seen that the rod 71 is rigidly attached to the mandrel 72 by the threads 73, so that when hydraulic pressure is applied to one side or the other of the piston 117 in the cylinder 116 through the hydraulic lines 113 and 138, the piston 117, and rod 71 and the mandrel 72 move as one piece. The spacing between the mandrel in its inserted position and the transition point 119 of the mold blocks is adjusted by the nut 115, which also prevents the piston 117 from bottoming in the cylinder 116. The end of the pipe 12 is compressed by the compression sleeve 74 which is pushed leftward toward the pipe 12 by the piston 129 of the cylinder 128. The piston 129 forms a slidable seal with the rod 71. The inlet and outlet ports of the cylinder 128 are not shown in FIG. 2, but the piston 129 is moved only leftward under hydraulic pressure. The piston 129 is returned rightward to withdraw the compression sleeve 74 by mechanical means. After the mandrel 72 has been withdrawn to the right a certain distance, its end 75 engages the compression sleeve 74, pulling it to the right. This lagging action permits the mandrel 72 to be freed from the pipe end 12c under hydraulic force before the compression sleeve is withdrawn.

The sequence of the operations of the pipe belling machine is programmed and controlled by two rotary programming switches. These switches are motorized so that at certain points in the cycle of operation, predetermined switch contacts are closed. The switch contacts of the rotary programming switches are used to open and close control circuits which drive power-switching relays. All heavy-duty power switching is done by the relays, which in turn operate clutch solenoids, pneumatic and hydraulic valves, electric motors, and the like.

Figure 9:
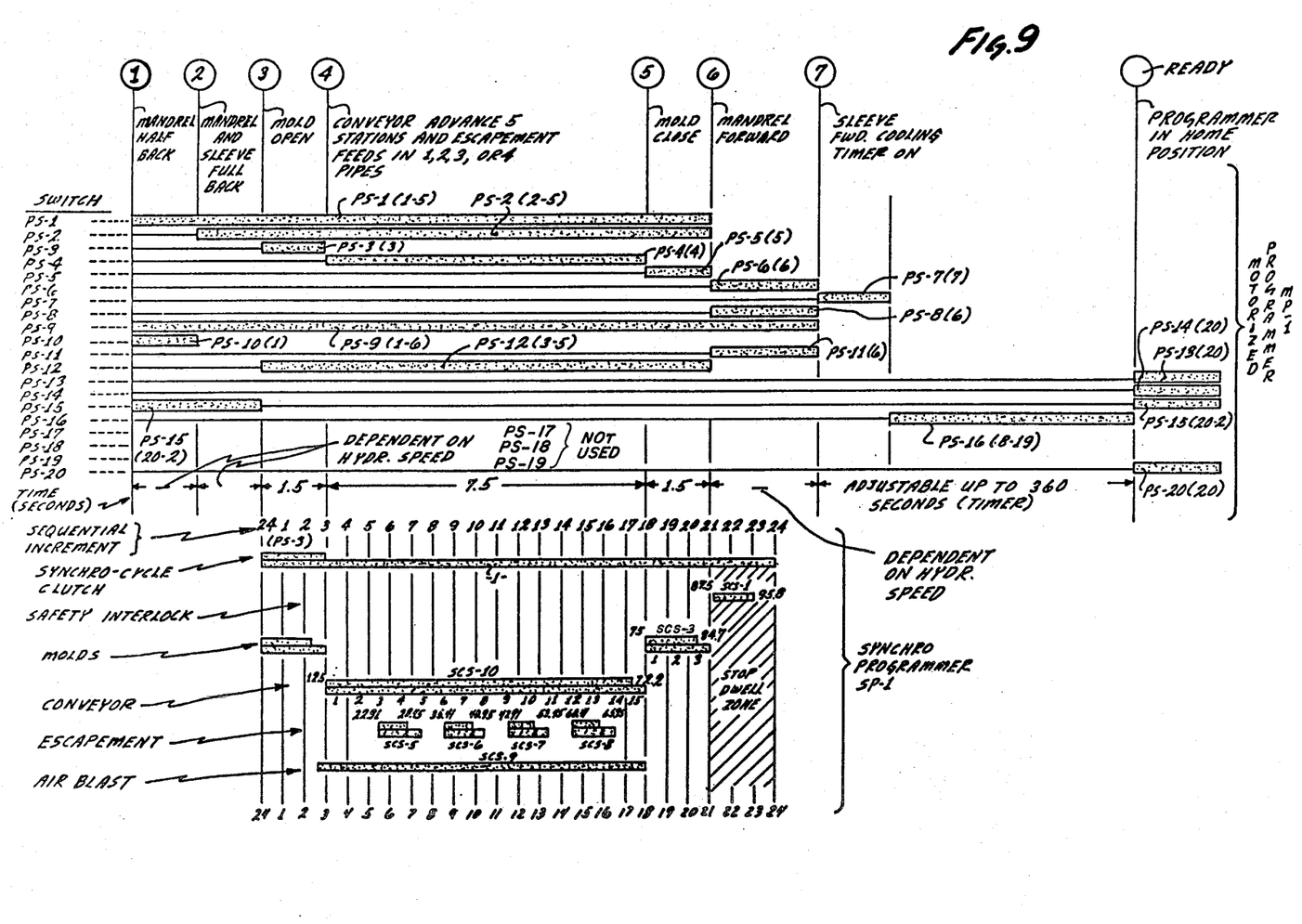
FIG. 9 is a diagram defining the operation of the programming switches used to control the operation of the pipe-belling machine in a preferred embodiment.

FIG. 9 shows the program sequence executed by the machine under control by the programmers. The functions shown in the upper half of the figure are controlled by a motorized programmer MP-1 which proceeds through a sequence of successive steps. This type of programmer is used because some of the steps are of indeterminate duration. The motorized programmer MP-1 does not proceed to the next step until it has received an indication, such as from a limit switch, that the preceding operation has been completed.

In the lower half of FIG. 9, there is shown the operations controlled by the synchro-programmer SP-1. The operations controlled by this programmer must be accurately synchronized in time, and this synchronism is provided by driving the shaft of the programmer SP-1 at a fixed speed to rotate a series of cams which are used to actuate switches at various stages of the rotation. The motorized programmer of the preferred embodiment could be implemented, in other embodiments, entirely electronically through the use of logic circuits, electronic clocks and counters. In still other embodiments, the programming and control of the pipe belling machine could be implemented by a computer, such as a microprocessor. As indicated in FIG. 9, the first step is to withdraw the mandrels from the pipes a short distance. During this operation, the tendency of the pipes to stick to the mandrels is overcome. In the second step, both the mandrels and the sleeves are retracted fully. In the third step, the molds are opened to receive the pipes, which until then have been in the heating station 24. In the fourth step, the conveyor, including the grooved cleats 30 and fingers 32, advances five stations while the escapement pipe feed 22 feeds in one, two, three or four pipes as desired.

Referring to FIG. 1, it is seen that the fifth station provides a space, equivalent to one pipe, between the groups of four pipes. This space corresponds to the space between the heating station and the belling station. In the fifth step, the mold halves are brought together, and at the sixth step the mandrels are plunged into the heated ends of the pipes. In the seventh step, the compression sleeves are driven into the spaces between the mandrels and the molds, compressing the pipes. Thereafter, a delay is programmed to permit cooling of the pipes prior to withdrawal of the mandrels at the start of the next cycle of operation.

During steps 3, 4 and 5 of the motorized programmer MP-1, the synchro-programmer SP-1 operates to synchronize the movement of the molds, the conveyor, and the pipe feed escapement 22 of FIG. 1. These motions are each controlled by electrically actuated clutches, and each clutch executes an integral number of revolutions each time it is activated. The clutches controlling these individual motions are driven from a common shaft and in this manner the motions of the molds, the conveyor and the escapement are synchronized. It will be noted that four separate switches, SCS-5, SCS-6, SCS-7 and SCS-8 are activated at successive times to operate the escapement, to selectively feed the pipes on to the conveyor. These switches can be disabled individually or in any desired combination so that a pipe may be selectively omitted at any of the four type positions. Table I describes the functions controlled by each of the programmer switches MPS-1 through programmer switches MPS-20.

As pointed out above, the various programmer switches control the operation of relays which control the operation of various pneumatic and hydraulic valves.

Figure 10:
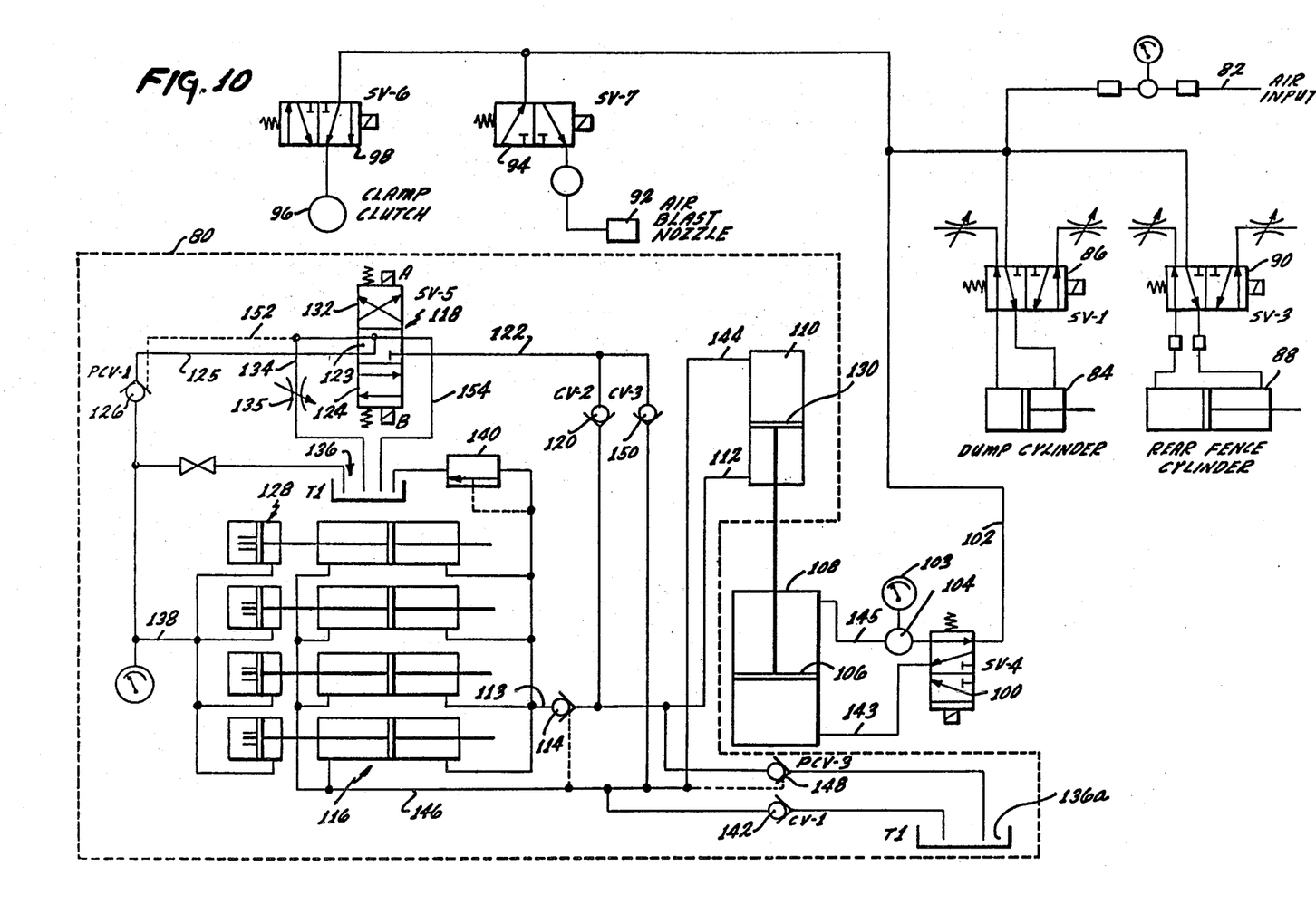
FIG. 10 is a schematic diagram of the pneumatically-boosted hydraulic system used in a preferred embodiment to drive the mandrels and compression sleeves.

FIG. 10 is a hydraulic-pneumatic diagram showing schematically how the pneumatic and hydraulic actuators of the pipe belling machine are interconnected. The system is a pneumatically-boosted hydraulic system. The hydraulic portion of the system is enclosed within the dashed line 80 of FIG. 10. The hydraulic fluid is pressurized by pneumatic pressure. This has the advantage that no pump power is required while the hydraulic pressure is being applied at the end of the compression stroke, as would be the case if the hydraulic pressure were supplied by a hydraulic pump.

TABLE 1

FUNCTIONS CONTROLLED BY THE SWITCHES OF MOTORIZED PROGRAMMER MP-1

| Switch | Function |
| --- | --- |
| PS-1 | Actuate SV-4 to retract mandrels |
| PS-2 | Actuate SV-5 coil A to retract sleeves |
| PS-3 | Actuate Sol-1 to start synchro-program |
| PS-4 | Advance MP-1 to Step 6 if conveyor indexed OK. |
| PS-5 | Advance MP-1 to Step 6 if clamps closed OK. |
| PS-6 | Not used. May be used to monitor Step 6 |
| PS-7 | Actuate SV-5 coil B to allow sleeves to advance |
| PS-8 | Actuate alarm TDR-2 if mandrels did not advance |
| PS-9 | Actuate alarm TDR-2 prior to Step 7 (jam) |
| PS-10 | Indicate no strip signal if machine stalled in Step 1 |
| PS-11 | Indicate cold bell if machine stalled in Step 6 |
| PS-12 | Indicate machine jam if stalled between Steps 3-5 |
| PS-13 | Reset programmer MP-1 to home autom., due to set-up switch |
| PS-14 | Reset R8 automatically due to homing |
| PS-15 | Actuate R9 for indication of premature actuation |
| PS-16 | Actuate R5 to reset hydraulic circuit (bottom) |
| PS-17 | Not used |
| PS-18 | Not used |
| PS-19 | Not used |
| PS-20 | Allow power for set-up position only in "home" position |

TABLE 1-continued

FUNCTIONS CONTROLLED BY THE SWITCHES OF MOTORIZED PROGRAMMER MP-1

| Switch | Function |
| --- | --- |
| | "home" position |

It is contemplated that a source of compressed air or similar gas, at a pressure 80 to 120 PSI is available where the pipe belling machine is to be installed. This high-pressure air enters the system at the line 82 and is applied in parallel to operate the dump cylinder 84 through the solenoid valve SV-1, 86, the rear fence cylinder 88 under control of the solenoid valve SV-3, 90, the air blast nozzle 92 under control of solenoid valve SV-7, 94, and a clamp clutch 96 under the control of the solenoid valve SV-6, 98. These pneumatically operated devices are supplied in parallel from the input line 82, and their function is not pertinent to the present discussion. The air used for pressurizing the hydraulic system is carried to solenoid valve SV-4, 100, through the line 102.

The insertion of the mandrel and the compression sleeve into the heated pipe end and their withdrawal from it are accomplished by the pneumatically-boosted hydraulic system. The cylinder 108 is a double-acting pneumatic cylinder in which a piston 106 may be driven in either direction depending on whether compressed air from the line 102 is supplied to it through the line 143 or through the line 145, as controlled by the solenoid valve SV-4, 100. The line 145 includes a pressure regulator 104 and a gauge 103 for manually adjusting the pressure applied to the compression sleeves.

At the start of each cycle of operation, compressed air is introduced to cylinder 108 through the line 145, causing the piston 106 to be forced downward. The piston 106 is connected to a piston 130 of smaller diameter in the hydraulic cylinder 110 which is completely filled on both sides of the piston with hydraulic fluid. Because the diameter of the piston 130 is considerably less than that of the piston 106, the pressure in the line 112 is greater than the applied pneumatic pressure in the line 145 by a factor equal to the ratio of the area of piston 106 to the area of piston 130.

Initially, the solenoid valve SV-5, indicated generally as 118, is de-energized so that the section 123 of it is utilized. In this position of the solenoid valve SV-5, no fluid can flow through the line 122. The line 146 is not pressurized and therefore the pilot-operated check valve 148 is closed. The pressurized fluid in the line 112 therefore can only flow through the pilot-operated check valve PCV-2 114, into the line 113 pressurizing the cylinders 116 which control the insertion of the mandrel. The compression sleeves, whose insertion is accomplished by the cylinders 128, are not inserted at this point. As the fluid flows into the righthand portion of the cylinder 116 through the lines 112 and 113, the piston 130 moves downward in the cylinder 110.

After the mandrel has been fully inserted, the solenoid valve SV-5, 118, is electrically switched so that the section 124 of it is utilized. With the valve in this state, the pressurized fluid in the line 122 is permitted to flow into the line 125, opening the check valve 126 and proceeding into the line 138 to pressurize the cylinders 128, thereby inserting the compression sleeves. During the flow of fluid into the cylinders 128, the piston 130 again moves further downward within the cylinder 110.

It is believed to be a novel feature of the hydraulic system of the present invention that after both the cylinders 116 and 128 have been filled to capacity with hydraulic fluid, the piston 130 still has not reached the bottom of the cylinder 110, but instead, a reserve of hydraulic fluid remains in the lower portion of the hydraulic cylinder 110. This reserve is highly desirable to compensate for any fluid that may be lost due to by-pass leakage during the time the cylinders are pressurized. Further, because the mandrel is heated, the fluid in the filled cylinders 116 also becomes heated by conduction and expands. Therefore, a pressure relief valve 140 is provided to accommodate this volumetric expansion by passing the excess fluid to the tank T-1, 136.

After the compression has been applied for a sufficient length of time, the solenoid valve SV-5, 118, is again switched so that section 132 of it is utilized. With the section 132 in place, the pressurized fluid in the line 122 flows into the line 134 which includes a flow control valve or restriction 135. The pressurized fluid from the line 122 flows through the flow control valve 135 and into the tank T-1, 136, permitting the piston 130 to move to the bottom of the cylinder 110. Further, because of the presence of the flow control valve 135, the pilot line 152 to the pilot-operated check valve PVC-1, 126, is pressurized, thereby relieving the pressure in the cylinders 128.

When the mandrels were inserted through the action of the cylinders 116, as hydraulic fluid entered the right-hand portion of the cylinder, a corresponding amount of hydraulic fluid was displaced from the left-hand portion of each cylinder. This fluid displaced from the left-hand portion passed through the line 146 and into the line 144 to go into the upper portion of the cylinder 110, thereby approximately replacing the volume of fluid flowing to the right-hand portion of the cylinders 116 through the line 112. During the remaining portions of the insertion phase, when the sections 124 and 132 of the valve 118 were successively used, hydraulic fluid was drawn in from the tank T-1, 136a, through the check valve 142 and through the line 144 to replace into the cylinder 110 the fluid that was discharged through the line 112. The tanks 136 and 136a are the same tank, but different reference numerals are applied to locate the portion of the tank referred to in FIG. 10.

At this stage the solenoid valve SV-4, 100, is activated so that pneumatic pressure from the line 102 is applied through the line 143 to the pneumatic cylinder 108, driving the piston 106 upward. This also drives the piston 130 upward within the hydraulic cylinder 110 applying hydraulic pressure to the fluid which completely fills the upper portion of the cylinder 110. Simultaneously, the solenoid valve SV-5, 118, is de-energized so that section 123 of it is utilized. With the valve 118 in that state, the pressurized fluid in the line 144 flows through the line 146 and into the left-hand portion of the cylinders 116, so that the full hydraulic pressure is applied to free the mandrels from the ends of the pipe. As is shown in FIG. 2, the mandrels and the compression sleeves are mechanically interrelated so that during the initial portion of the withdrawal motion of the mandrels the compression sleeves remain in their fully inserted positions. However, further withdrawal of the mandrels pulls the compression sleeves with them through a mechanical interaction as shown in FIG. 2.

Therefore, after the mandrels have been freed from the ends of the pipe, further withdrawal of the mandrels and withdrawal of the compression sleeves are virtually unopposed. Therefore, after the mandrels have been freed from the pipe ends, the valve 118 is again activated so that the portion 132 is again utilized. Pressurized hydraulic fluid from the line 144 passes through the check valve CV-3, 150, through the line 122 and through section 132 of the valve 118, pressurizing the pilot line 152 to open the check valve PCV-1, 126. This permits the hydraulic fluid discharged from the cylinders 128 to flow into the tank T-1, 136, through the lines 125 and 154. Simultaneously, a portion of the fluid in the line 122 flows through the line 134, through the flow control valve 135 and into the tank T-1, 136. Because the flow through the flow control valve 135 is restricted, sufficient pressure remains in the line 146 to permit completion of the withdrawal of the mandrels and the compression sleeves.

At this point, the piston 130 has still not reached its uppermost position in the cylinder 110, a reserve of fluid remaining in the upper chamber of that cylinder. This reserve of fluid compensates for any loss of fluid during the time when the left-hand portion of the cylinders 116 are pressurized. When the pistons of the cylinders 116 and 128 have completed their rightward travel and can move no further, the reserve of fluid in the upper chamber of the cylinder 110 is discharged into the tank T-1 through the line 134 and the flow control valve 135, the section 132 of the valve 118 remaining in use until, the reserved fluid having been discharged, the piston 130 reaches its uppermost position in the cylinder 110.

As the mandrels were freed from the pipe ends, fluid flowing through the line 112 and the line 146 into the left-hand portions of the cylinders 116 was replaced by the fluid discharged from the right-hand portions of the cylinders 116. This fluid discharged was passed through the line 113 and through the pilot-controlled valve PCV-2, 114, which was opened by the pressure in the line 146 so that the discharged fluid was replaced into the lower portion of the cylinder 110 through the line 112, the section 123 of the valve 118 being used at that time. During the final phase of the operation in which the reserve of fluid in the upper portion of the cylinder 110 was discharged into the tank T-1, 136, pressure in the lines 144 and 146 opened the pilot-controlled check valve PCV-3, 148, to permit fluid to be replaced in the lower portion of the cylinder 110 through the line 112.

Following discharge of the fluid reserve from the upper portion of the cylinder 110, the cycle is complete, and the solenoid valve SV-5, 118, is de-energized so that the section 123 of it is again in position for use when the next cycle of operation begins with activation of the solenoid valve SV-4, 100, to apply pneumatic pressure to the line 145.

The use of a reserve of hydraulic fluid at the end of each stroke of the piston 130 in the hydraulic cylinder 110 enables the system to operate effectively even if a considerable loss of hydraulic fluid has occurred. This is important because of the expense involved in shutting down the extrusion line in the middle of a run. Fluid lost through leakage can readily be replaced by adding fluid to the tank T-1, which is never pressurized.

Thus, there has been described a pipe belling machine employing a novel mechanism for handling groups of pipes which are processed through the heating and belling stations in parallel. In this manner, the production rate of the machine is increased approximately fourfold.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

We claim:

1. A pipe belling machine capable of a high rate of production and having a dead station at which the pipes to be belled are lying side by side awaiting advancement along a predetermined path in a forward direction perpendicular to their elongated dimension, and in which the incoming pipes are being urged foward at all times along the predetermined path, said pipe belling machine comprising:

an escapement device including a shaft selectively rotatable and located below the predetermined path with its axis of rotation extending substantially in the forward direction, including a first gate affixed to said shaft and lying substantially in a plane perpendicular to the axis of the shaft, and shaped to lie entirely below the path of the first waiting pipe during a portion of each revolution to permit the pipe to advance past it in the forward direction, and shaped to lie at least partially in the path of the remaining waiting pipes during the remainder of each revolution to block further forward motion of the remaining waiting pipes, and further including a second gate affixed to said shaft and lying substantially in a plane perpendicular to its axis and spaced axially along said shaft forward of said first gate a distance approximately equal to the diameter of one of the pipes and shaped to lie at least partially in the path of a pipe advanced from the first gate during the time the first gate lies entirely below the path of the first waiting pipe to block further forward motion of the pipe advanced from the first gate and shaped to lie entirely below the path of the pipe advanced from the first gate during a part of each revolution to permit that pipe to advance forward beyond the second gate, the first gate and the second gate being affixed to the shaft at such relative rotational positions that the first gate lies at least partially in the path of the waiting pipes when the second gate lies entirely below the path of the pipe advanced from the first gate to block unrestricted forward motion of the remaining waiting pipes;

positioning means establishing a sequence of stops which are successively extended into the path taken by the objects released from said escapement device between successive pipes for restraining their forward motion and maintaining their spacing, the sequence of stops having a predetermined spacing in the forward direction and being selectively movable in that direction while extended between successive pipes;

control means for controlling the forward motion of the sequence of stops and for selectively rotating the shaft one full revolution each time said positioning means has advanced by one stop, to selectively discharge a pipe behind a newly-extended stop;

said positioning means and said control means cooperating for selectively placing pipes at a group of predetermined spaced locations along a line of motion, and for maintaining the relative spacing of the pipes as they are transferred as a group from a heating station to a belling station and as they are transferred as a group from the belling station to an output station;

a multiple-pipe heating station for simultaneously heating the ends of a group of pipes; and, a multiple-pipe belling station for simultaneously belling a group of pipes.

2. The improvement of claim 1 wherein said multiple-pipe belling station further comprises a plurality of individually replaceable mandrels and molds.

* * * * *

UNITED STATES PATENT AND TRADEMARK OFFICE
CERTIFICATE OF CORRECTION

PATENT NO. : 4,323,337

DATED : April 6, 1982

INVENTOR(S) : Wolfram G. Korff et al.

It is certified that error appears in the above-identified patent and that said Letters Patent is hereby corrected as shown below:

On the title page Insert:

-- (73) Assignee: P.M.C./Ramco, Inc., Fort Worth, Texas --.

Signed and Sealed this

Twentieth Day of July 1982

[SEAL]

*Attest:*

*Attesting Officer*

GERALD J. MOSSINGHOFF

*Commissioner of Patents and Trademarks*